Jan. 10, 1939.  E. L. ABRAMSON  2,143,825

STUFFING BOX CONSTRUCTION

Filed May 12, 1936

INVENTOR
Ernest L. Abramson
BY
Evans & McCoy
ATTORNEYS

Patented Jan. 10, 1939

2,143,825

UNITED STATES PATENT OFFICE 2,143,825

STUFFING BOX CONSTRUCTION

Ernest L. Abramson, Davenport, Iowa, assignor to Micro-Westco, Inc., Bettendorf, Iowa, a corporation of Delaware Application May 12, 1936, Serial No. 79,238

2 Claims. (Cl. 286—32)

This invention relates to stuffing boxes and has particular reference to stuffing boxes provided with self-adjusting packing glands.

An object of my invention is to provide a stuffing box follower or gland which will not become loose or require attention when installed, but which will maintain a substantially uniform pressure on the packing material, facilitate the estimation of the pressure on the packing material by visual observation, and be simple to adjust.

A further object of this invention is to provide a stuffing box follower or gland easy to remove from the stuffing box for such purpose as replacing the packing material.

A still further object is to provide a device of this character which is simple in design, inexpensive to manufacture, and adapted to be used in connection with existing stuffing boxes without substantial changes in design or construction.

Further objects will appear as I proceed with the description of my invention, the novelty of which is intended to be pointed out and claimed.

Figure 2:
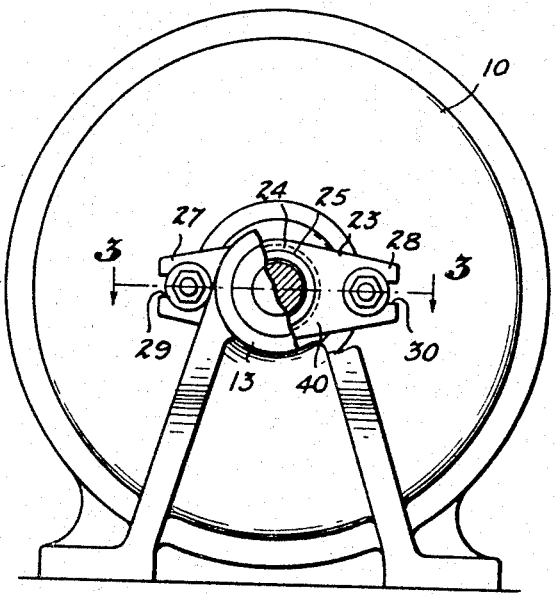
Fig. 2 is an end elevation of the pump illustrated in Fig. 1 with parts broken away to more clearly show the stuffing box gland or follower.

Briefly, my invention comprises a gland or follower having a resilient plate attached to the end protruding from the stuffing box. When the device is assembled the extremities of the flexible plate are flexed toward the stuffing box proper and fixed in the flexed position. Thus the gland or follower continually exerts pressure against the packing material effecting a fluid-tight joint requiring a minimum of attention.

Referring more particularly to the drawing, 10 designates the casing of a centrifugal pump which it is desired to make fluid-tight. In the center of the casing is a stuffing box 11 through which passes the shaft 12 of the pump.

The body portion 16 of the stuffing box 11 defines an elongated cylindrical stuffing chamber 17, larger in diameter than the shaft 12. One end of the stuffing chamber decreases in diameter to form the circumferential boss 18, which has a running fit with the shaft 12. The stuffing chamber 17 completely surrounds a portion of the shaft 12, and, when filled with a suitable packing material 19, under pressure, will form a seal to prevent the passage of fluid from one side of the stuffing box to the other.

To obtain an efficient stuffing box it is essential that the packing material exert a continuous circumferential pressure on the shaft to prevent the passage of fluid. In order to maintain the packing material under pressure the gland or follower 20 is provided. It has an internal diameter slightly larger than the shaft 12 and an external diameter slightly smaller than the diameter of the packing chamber 17, so that it can ride upon the shaft 12 and be moved freely into the packing chamber 17 to compress the stuffing material into the form of an annulus.

In this invention the follower is continuously forced against the packing material to maintain the internal pressure in the stuffing chamber. The gland 20 has one end 21 projecting within the packing chamber 17 so that it is guided by the body portion 16 of the stuffing box and is prevented from binding the shaft. The outer end 22 of the gland projects from the body portion 16 of the stuffing box to permit longitudinal movement. This outer end 22 is provided with a substantially flat, resilient plate, such as the leaf spring 23. I prefer to attach the leaf spring to the gland by forming a shoulder 24 and a portion 26 of reduced diameter on the end 22 of the gland 20. A hole 25 in the resilient plate fits over the end 22 of the gland 20 so that the marginal portion of the plate 23 surrounding the hole 25 engages the shoulder 24 and reduced diameter portion 26 of the gland 20. To prevent the rotation of the gland 20 with the shaft 12 the portion 26 of the gland 20, which projects through the hole 25 in the leaf spring 23 is riveted over the adjacent marginal portion of the leaf spring around the hole 25.

In the preferred embodiment of my invention the tapering ends 27 and 28 of this leaf spring are provided with centrally extending slots 29 and 30, which receive the shanks 31 of the swivel bolts 32 and 33. The bolts 32 and 33 are preferably pivoted by means of the pin bolts 34 in recesses 35 in the bosses 36 which are shown as being formed integrally with, and on diametrically opposed sides of the stuffing box 11. The nuts 37 on the swivel bolts 32 and 33 engage flat portions of the leaf springs 23 adjacent the slots 29 and 30.

In assembling the unit the gland or follower 20 is moved into position within the open end of the stuffing chamber 17, the swivel bolts 32 and 33 are swung into the positions shown, with their shanks 31 lying respectively in the slots 29 and 30 of the leaf spring 23, and the nuts 37 tightened, whereby the leaf spring 23 is flexed and the follower 20 urged toward and against the packing material 19.

Figure 3:
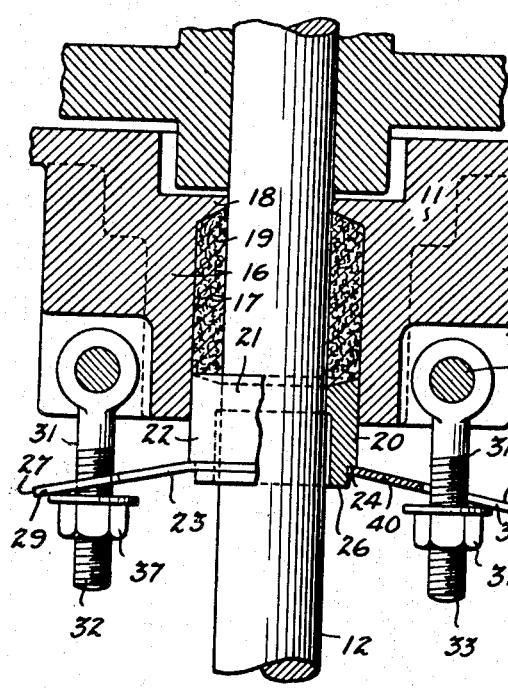
Fig. 3 is a horizontal section on line 3—3 of Fig. 2.

It has been found desirable, in fabricating the leaf spring 23, to bend it adjacent the hole 25 so that it normally assumes the arcuate form shown in Fig. 3 with the convex side toward the stuffing box. The bending of the leaf spring in this manner keeps the swivel bolts 32 and 33 in engagement with the leaf spring because one component of the force exerted by the leaf spring tends to urge the swivel bolts toward the shaft 12. It will also be seen that when the packing 19 has been considerably worn so that the gland 20 is substantially all within the stuffing chamber 17 the extremities 27 and 28 of the leaf spring 23, because of their being bent outwardly in this manner, will not be forced against the bosses 36.

Tightening the nuts 37 on the bolts 32 and 33 flexes the leaf spring 23 and tends to force the gland 20 into the stuffing chamber 17. In this manner the packing material 19 is tightly compressed about the shaft 12 effecting a fluid tight seal. It will be seen that at all times the packing material 19 is compressed because of the pressure exerted thereupon by the gland 20. As the packing material wears away or loses its volume, the gland 20 will move further inside the body portion 16 of the stuffing box and the packing material will be maintained under compression.

Since the leaf spring member 23 is flexed by tightening the nuts 37, the gland 20 can move a considerable distance into the stuffing chamber 17 after a single adjustment under the positive pressure exerted thereon by the leaf spring 23. Consequently no adjustment of the gland will be necessary during the operation of the device on which this type of gland or follower is employed for a considerable period of time or until the gland 20 has moved far enough into the stuffing chamber 17 so that the leaf spring member 23 is completely deflexed and no longer exerts a pressure on the gland. In tightening the nuts 37 either when compensating for the wear in the packing material 19 or after having repacked the stuffing box, the pressure exerted on the stuffing material 19 by the gland 20 may be readily estimated by visual observation of the amount of deflection of the leaf spring member 23.

Figure 1:
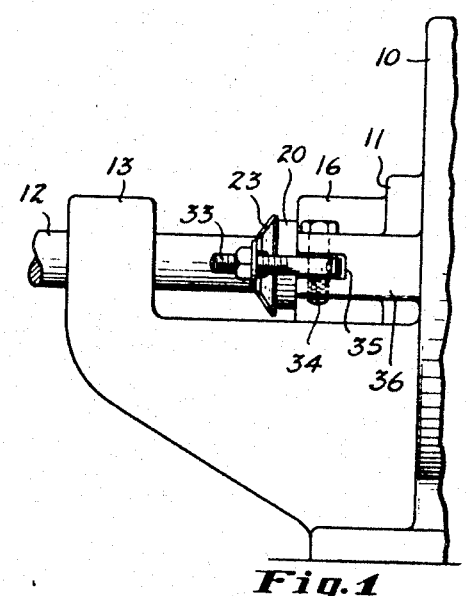
Figure 1 is a side elevation of one end of a rotary pump illustrating a preferred embodiment of my invention as it would appear applied to the stuffing box for the shaft of such pump.
Figure 5:
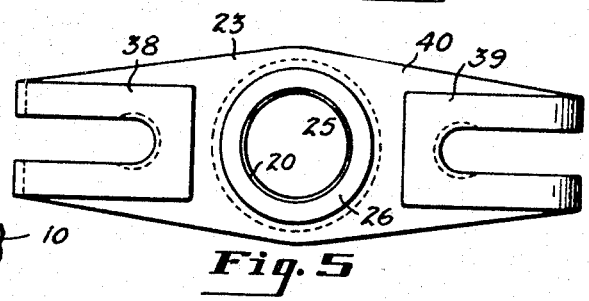
Fig. 5 is a plan view of the modification illustrated in Fig. 4.
Figure 4:
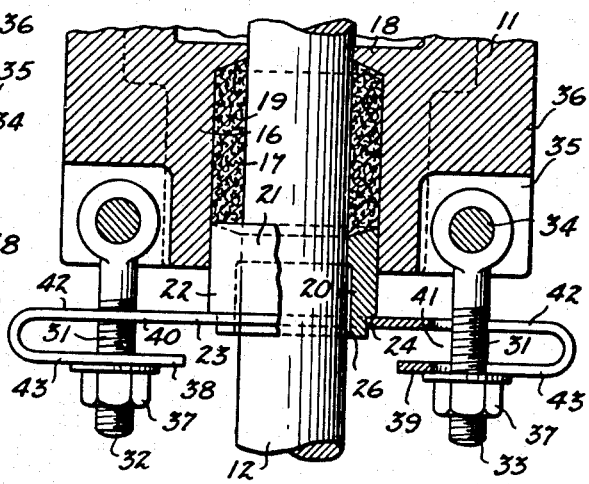
Fig. 4 is a section similar to Fig. 3 showing a modified form of my invention.

In Figs. 4 and 5 I have illustrated a modification of my invention in which the extremities 38 and 39 of the leaf spring 23 have been folded back upon the main or body portion 40 of the spring but separated therefrom by a flexing space 41. Each of these folded over portions has slots corresponding to the slots 29 and 30 of the embodiment of my invention hereinabove described. In this modification, however, it will be seen that these slots are double, comprising slots 42 in the body portion 40 of the leaf spring and slots 43 in the end portions 38 and 39 of the leaf spring. It will be seen that since the effective length of the leaf spring element shown in Figs. 4 and 5 is considerably greater, relatively speaking, than the leaf spring element shown in Figs. 1, 2, and 3, it will be somewhat more resilient.

When repacking a stuffing box employing a gland or follower constructed according to the present invention, it is only necessary to loosen the nuts 37 on the bolts 32 and 33 sufficiently so that the spring 23 is deflexed, swing the swivel bolts 32 and 33 away from the shaft 12 so that they disengage the slots in the leaf spring, and then withdraw the gland 20 from the body member 16 of the stuffing box. In this withdrawn position the old packing material 19 can be removed and replaced, if necessary, after which the device is reassembled.

Without departing from the scope of the present invention, intended to be covered by the appended claims, numerous modifications of my invention are contemplated, particularly in the construction of the leaf spring member 23.

What I claim is:

1. In a stuffing box construction, a housing, a rotatable shaft extending through the housing, a follower slidable on the shaft and in the housing, packing disposed in the housing, a resilient plate having a central portion apertured to receive the shaft and adapted to seat against the outer end of the follower, said plate having projecting end portions each provided with a slot in its outer extremity, swivel bolts pivoted on the housing and swingable into the slots of the resilient plate, nuts carried by the swivel bolts engageable with the end portions of the resilient plate whereby the plate can be flexed to resiliently urge the follower toward the packing, and the nut engaging surface of said end portions formed at an angle to the normal pressure of the nuts to urge the bolts toward the closed ends of the slots.

2. In a stuffing box, a housing, a shaft extending through the housing, packing disposed around the shaft in the housing, a follower slidable on the shaft and in the housing, a resilient curved plate engaging the follower and having projecting end portions, slots in the end portions having their closed ends toward the shaft, bolts pivoted to the housing and positioned in the slots, nuts on the bolts, said nuts engaging the end portions of the plate adjacent the slots to flex the plate and resiliently urge the follower against the packing, and said plate having its convex side toward the housing and the projecting end portions directed away from the housing to provide surfaces sloping toward the shaft for engagement with the nuts to thereby urge the bolts toward the closed ends of the slots.

ERNEST L. ABRAMSON.